Figure 1:
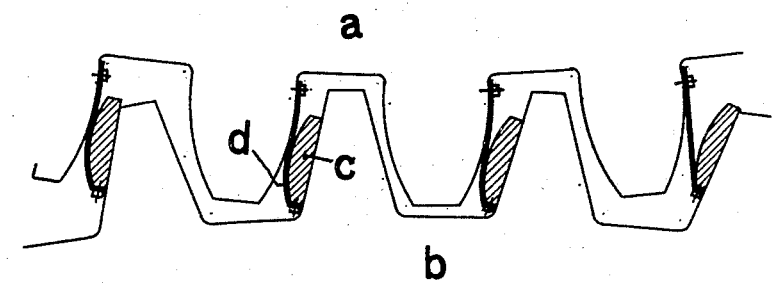

J. DE FREUDENREICH AND A. SPOERRY.
TOOTHED WHEEL GEARING.
APPLICATION FILED OCT. 17, 1919.

Patented Mar. 7, 1922.

Inventors
J. de Freudenreich
A. Spoerry
By H. R. Kerslake
Attorney

UNITED STATES PATENT OFFICE.

JEAN DE FREUDENREICH AND ANDRÉ SPOERRY, OF ZURICH, SWITZERLAND, ASSIGNORS TO AKTIENGESELLSCHAFT BROWN, BOVERI & CIE, OF BADEN, SWITZERLAND.

TOOTHED-WHEEL GEARING.

1,408,568.      Specification of Letters Patent.      Patented Mar. 7, 1922.

Application filed October 17, 1919. Serial No. 331,286.

*To all whom it may concern:*

Be it known that we, JEAN DE FREUDENREICH, a citizen of the Swiss Republic, and ANDRÉ SPOERRY, a citizen of the Swiss Republic, both residing at No. 2 Schonleinstrasse, Zurich, Switzerland, have invented certain new and useful Improvements in Toothed-Wheel Gearing, of which the following is a specification.

In toothed wheel gearing the relative motion of the intermeshing teeth can be resolved into two components, one of which represents a rolling motion of the teeth flanks over each other, and the other component represents a sliding motion of the teeth flanks along each other. The sliding movement of the teeth along each other can be reduced to a minimum by employing suitable teeth outlines. In all cases however the mutual contact between the teeth takes place only along a line or only at one point. Consequently very high unitary pressures are produced at the place of contact, so that the film of oil that is situated between the teeth is squeezed out at the place of contact and at the same time the unitary stress upon the material of the teeth is so high owing to the sliding motion, as to render it impossible to place a high load upon toothed wheel gearing.

The present invention has for its object to obviate those drawbacks by giving to the places of sliding contact between the teeth the form of surfaces. This is effected by interposing between the intermeshing teeth movable intermediate members that are attached to the teeth of one wheel and are adapted to roll only over the teeth flanks of this wheel in the plane of the said wheel, whilst they only slide along the teeth flanks of the other wheel. To this end the teeth outlines and the said intermediate members are so shaped that only a rolling motion takes place between the teeth flanks of one wheel and the said intermediate members, whilst only sliding motion takes place between the teeth flanks of the other wheel and the said intermediate members. For this purpose the outline curves rolling over each other must of course be so chosen as to satisfy the well known conditions for a proper intermeshing of the teeth. Contact between the teeth of the first wheel and the said intermediate members takes place along a line, but only with a rolling motion; there is no sliding motion. On the contrary however it is possible to give to the places of contact between the teeth of the second wheel and the said intermediate members between which sliding motion takes place, the form of surfaces of such dimensions as will ensure that only a moderate unitary pressure will be produced, and the squeezing out of the oil will be avoided. The relative motion of the teeth flanks is resolved by means of the said intermediate members into its two components, rolling motion and sliding motion, by reason of the arrangement that the said intermediate members roll (without sliding) over the teeth flanks of one wheel, and slide (without rolling) along the teeth flanks of the other wheel.

It is not necessary that the teeth outlines should be designed, as heretofore, from the point of view of reducing the sliding motion to a minimum. On the contrary the teeth outlines may with advantage be so designed as to produce a maximum sliding motion between the said intermediate members and the teeth flanks of one wheel, because this has the result of furnishing a continuous supply of lubricant to the contacting surfaces. Moreover, by making the rolling surfaces of suitable shape it is possible to arrange that the point of pressure contact on the intermediate member shall always be situated on that side of the central transverse plane of said intermediate member as will facilitate the formation of a wedge of oil between the sliding surface, according to the well known principle of Professor Osborne Reynolds as applied practically in U. S. Patent No. 947242 to Kingsbury. The said intermediate members may be attached to the teeth of that one of the two intermeshing wheels over the tooth flanks of which they roll. Instead of rolling, they may be arranged to turn on a point.

Figure 2:
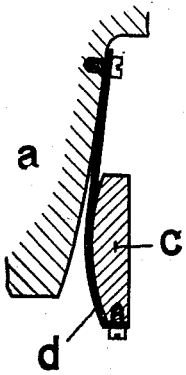
Figure 3:
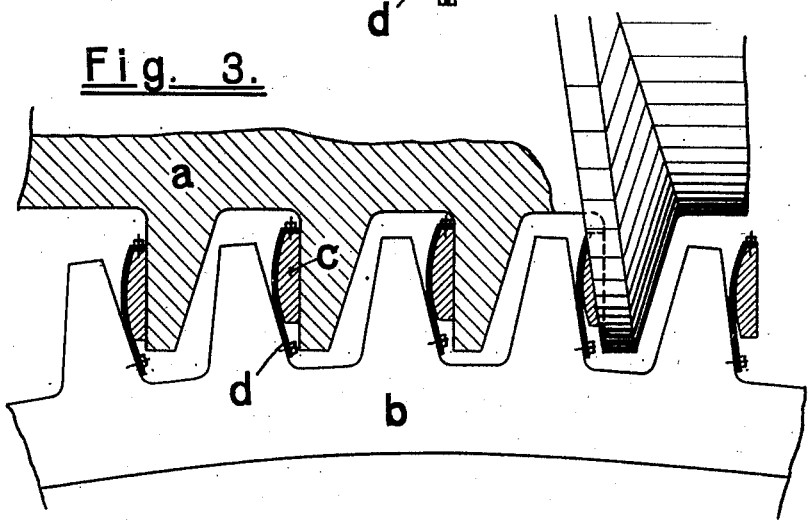

In the accompanying drawings Figure 1 shows the fragment of a pair of spur wheels with the improvement applied thereto, and Figure 2 shows to an enlarged scale the method of attaching the intermediate member to the curved side of a tooth, and Figure 3 shows the application of the invention to a worm and worm wheel.

Fig. 1 illustrates a spur wheel gearing. *a* is assumed to be the driving toothed wheel, and *b* the driven toothed wheel. *c* are the intermediate members which, as shown in Fig. 2, are attached to the wheel *a* by means of flexible leaf springs *d*. These said intermediate members enter between the teeth flanks of the two wheels at the intermeshing point, and move in such a manner that they slide along the teeth flanks of the wheel *b*, whilst they roll over the teeth flanks of the wheel *a*. Moreover the eccentric situation of the points of pressure contact of the intermediate members is apparent from Figs. 1 and 2. As shown, the point of pressure contact on the face of the intermediate member is eccentric in the desired sense from the beginning of the meshing up to the point of contact between the pitch circles. The point of pressure contact is central at the point of contact of the pitch circles, in which position there is no sliding motion. In the continued motion of the toothed wheels the direction of the sliding motion changes, and the position of the point of pressure contact also changes, thus bringing the point of pressure contact back again into such an eccentric position as will facilitate the formation of a wedge of oil between the surfaces.

Fig. 3 illustrates a worm gear constructed on the same principle. *a* is the worm, and *b* the wormwheel to the teeth of which the intermediate members *c* are attached by means of leaf springs *d*. In order to cause the formation of an oil wedge in worm gears of this kind, and generally in all gears for toothed wheels with crossing axes, the intermediate members *c* must be mounted in such a manner that the point of action of the load in the direction of the motion of the worm *a* shall be situated eccentrically to the centre of the intermediate member; only that in this case the direction of the motion is rendered by the crossing of the axes, different from that of the arrangement shown in Fig. 1. In this case also the intermediate members on the flank over which they roll, will also be able, in addition to this motion, to have a tilting motion in the direction of the sliding motion of the worm tooth, and thereby be enabled to assume an oblique position in this direction in a well known manner, which will improve the lubrication.

It will be seen that such a gearing as above described can be modified for use in other types of transmission gear such as skew and bevel gear and other forms of gear which may be used for different purposes.

What we claim is:—

1. A gear having an operative gear member, a second member having plane and curved working faces positively mounted to rock on said operative gear member and to transmit force.

2. A gear having an operative gear member and a second member having plane and curved working faces resiliently mounted on a part of said gear to rock in relation to said operative gear member and to transmit force.

3. A gear having an operative gear member, a second member having plane and curved working faces adapted to co-act with said operative gear member to transmit force and a blade spring disposed between said members maintaining positively said second member in juxtaposition to said gear.

4. In combination, a pair of gears having driving and driven members in mesh and an intermediate member having plane and curved working faces disposed between said meshing members, which is mounted positively to rock on one of said gears while in pressure transmitting sliding contact with the other.

5. In combination, a pair of toothed gears in mesh and an intermediate member which is disposed between a pair of meshing teeth and is in contact over a surface with a tooth of one of said gears, and a resiliently restraining connection between said intermediate member and the other of said gears.

6. In combination, a pair of toothed gears in mesh and an intermediate member disposed between a pair of meshing teeth which is mounted to rock on a tooth of one of said gears and is in sliding contact over a surface with a tooth of the other of said gears.

7. In combination, a pair of gears having driving and driven members in mesh; a pressure-transmitting member disposed between said first-mentioned members and a blade spring maintaining said pressure-transmitting member in operative relation to one of said first-mentioned members.

8. In combination, a pair of gears having a pair of teeth in mesh, one of said teeth having a curved flank; an intermediate member disposed between said teeth, said intermediate member having a surface in contact with the other of said teeth; and means constraining said intermediate member to roll in relation to the flank of said first-mentioned tooth and to slide in relation to the flank of the said other tooth.

9. In combination, a pair of gears having driving and driven members in mesh; an intermediate member disposed between said meshing members; and yielding means for maintaining said intermediate member in operative relation to one of said meshing members, such yielding means permitting the tilting of said intermediate member in response to the forces acting thereon and the introduction of a wedge of lubricant between said intermediate member and the other of said meshing members.

10. In combination, a pair of gears having a pair of teeth in mesh, one of said teeth having a curved flank and the other a plane flank; an intermediate member located between said teeth and having a curved surface disposed towards the curved flank of said one tooth and a plane surface in contact with the plane flank of said other tooth; and a blade spring maintaining said intermediate member in operative rolling relation to said tooth having the curved flank.

In testimony whereof we have signed our names to this specification.

JEAN DE FREUDENREICH.
ANDRÉ SPOERRY.